Aug. 21, 1945.  C. H. JORGENSEN  2,383,198
ENGINE CONTROLLER
Filed Feb. 11, 1943  9 Sheets-Sheet 1

INVENTOR
Clarence H. Jorgensen
BY
his ATTORNEYS

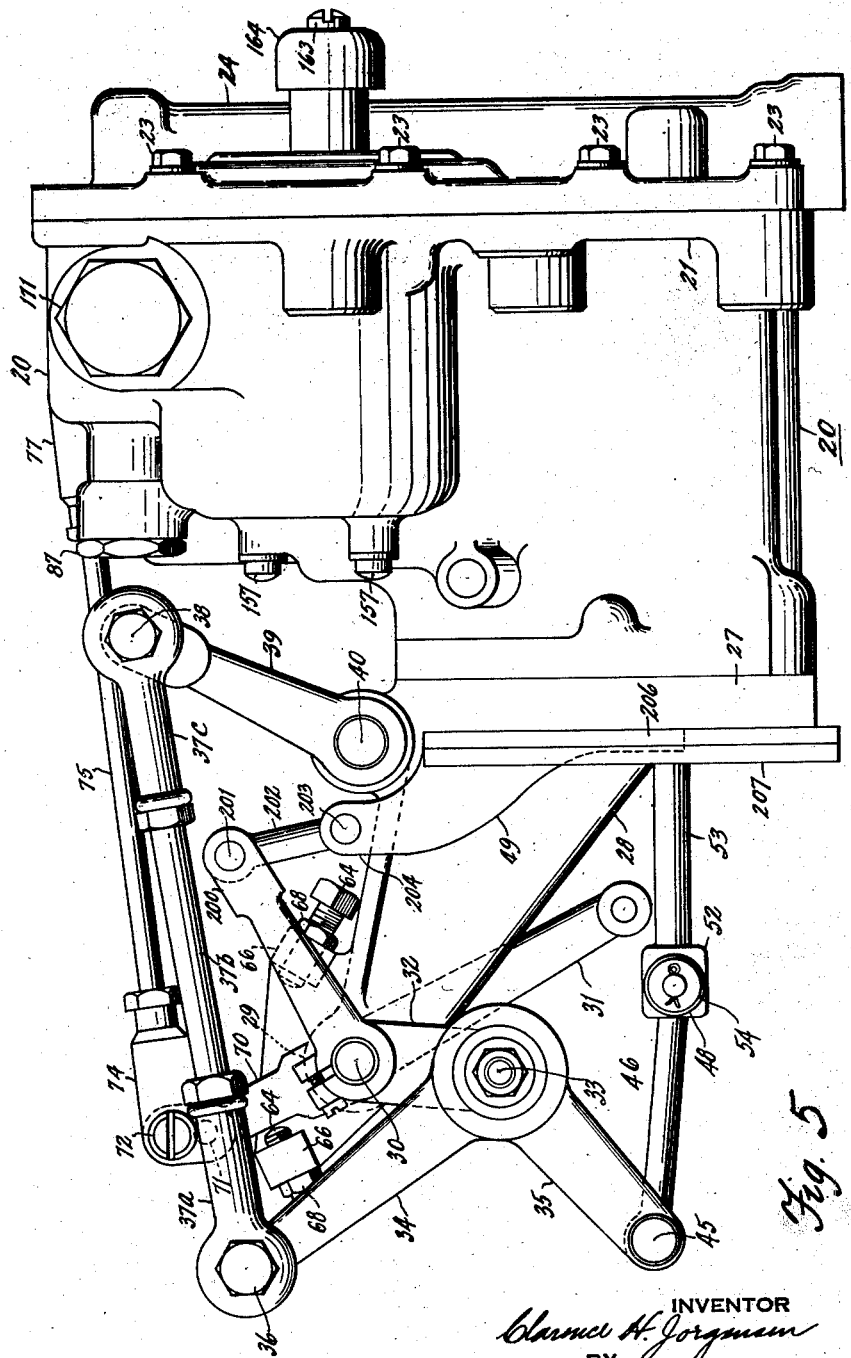

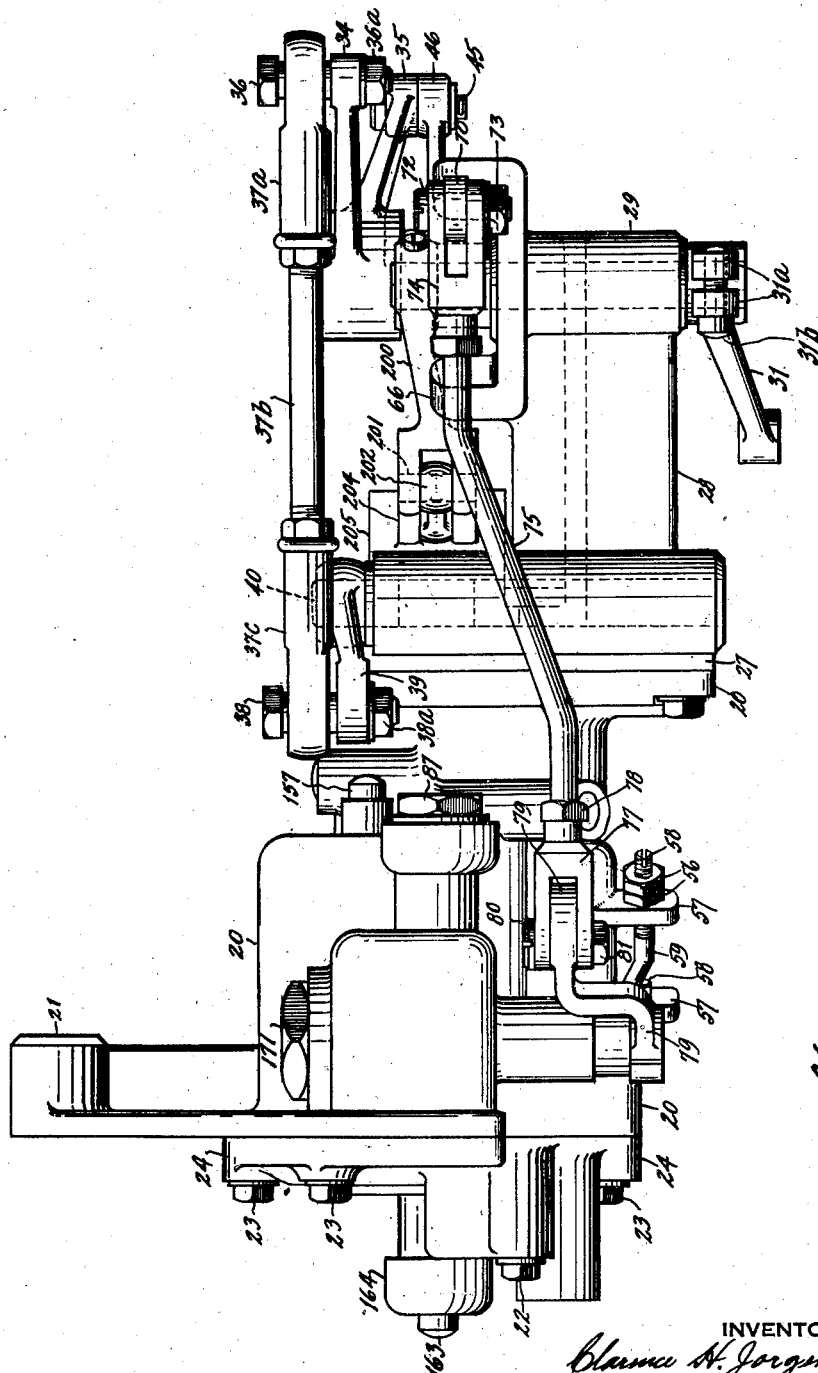

Aug. 21, 1945.  C. H. JORGENSEN  2,383,198
ENGINE CONTROLLER
Filed Feb. 11, 1943  9 Sheets-Sheet 5
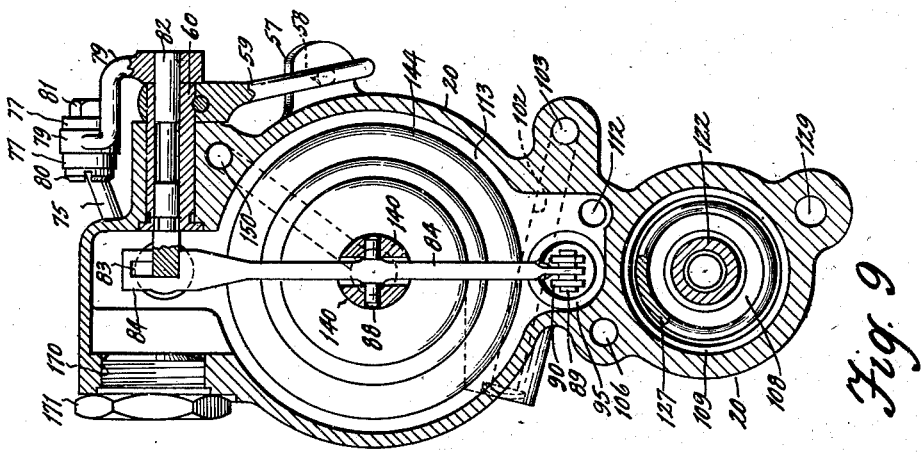
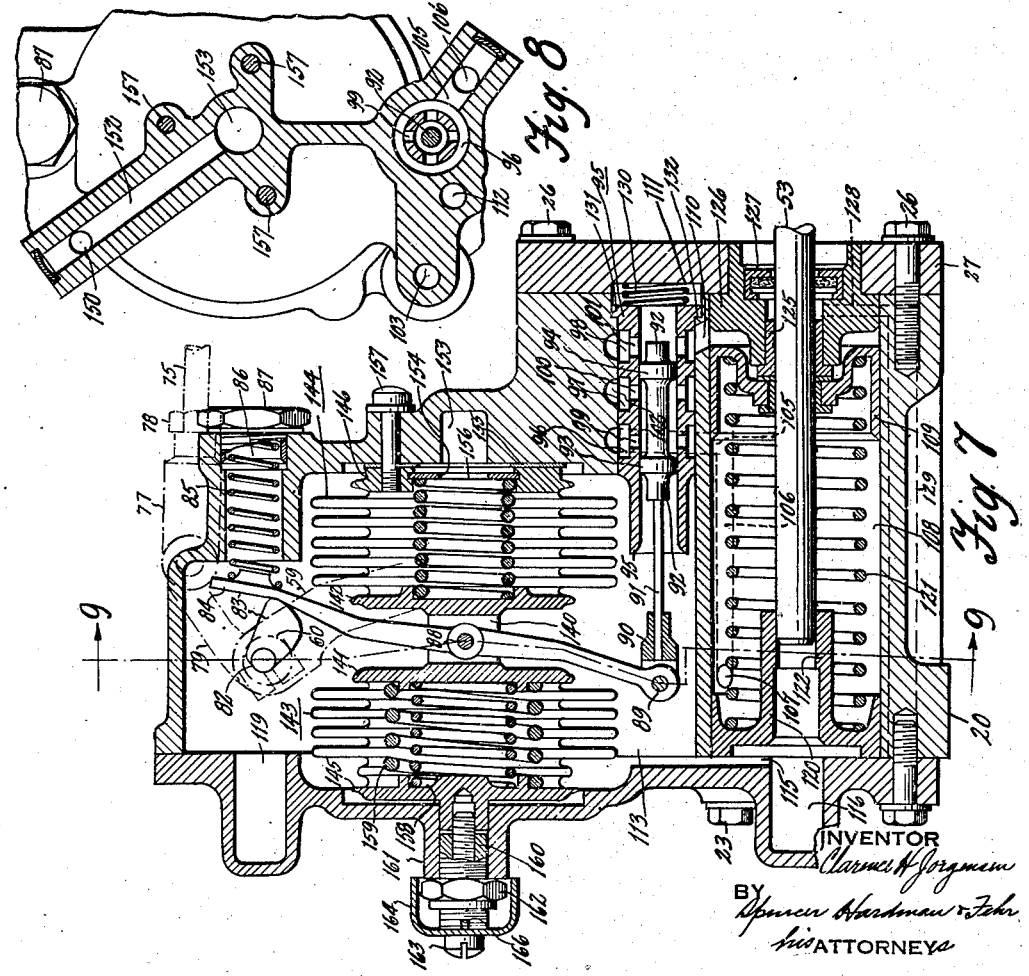
INVENTOR
Clarence H. Jorgensen
BY
Spencer Hardman & Fehr
his ATTORNEYS Aug. 21, 1945.    C. H. JORGENSEN    2,383,198
ENGINE CONTROLLER
Filed Feb. 11, 1943    9 Sheets-Sheet 6

Inventor
Clarence H. Jorgensen
by Spencer Hardman & Fehr
his attorneys

Patented Aug. 21, 1945

2,383,198

UNITED STATES PATENT OFFICE 2,383,198

ENGINE CONTROLLER

Clarence H. Jorgensen, Anderson, Ind., assignor to General Motors Corporation, Detroit, Mich., a corporation of Delaware Application February 11, 1943, Serial No. 475,559

4 Claims. (Cl. 123—119)

This invention relates to fuel intake pressure controllers for supercharged internal combustion engines used on airplanes. A type of pressure controller to which the present invention relates is disclosed in Dolza et al. application, Serial No. 449,918, filed July 6, 1942. The controller of the Dolza application has a main control lever connected with the pilot's throttle control lever.

The main control lever is operated to select an intake pressure to be maintained during operation of the aircraft at varying altitudes and is effective to move the throttle toward open position an amount approximating that for take off or for producing the selected pressure at sea level. With increasing altitude the opening movement of the throttle which is brought about by the manually operated lever is supplemented by an additional movement of the throttle brought about automatically and such movement is sufficient to move the throttle to whatever position is necessary to maintain the intake pressure selected by the main control lever. That pressure is maintained on decrease in altitude by automatically moving the throttle toward closed position the required distance.

The automatic control of the throttle is effected by an hydraulic servo-motor having a control valve which is initially set by the manually operated main control lever for the purpose of selecting the fuel intake pressure to be maintained and which is adjusted by means responsive to fuel intake pressure in order that the servo-motor will operate to the extent required for automatically moving the throttle valve to obtain the fuel intake pressure selected, independently of altitude. The extent of throttle opening obtained manually plus the extent of throttle opening obtained automatically gives wide open throttle position at critical altitude for a limited range of selection of high intake pressure such as required for take-off and emergency operation of the engine. The controller of the Dolza application does not provide for wide open throttle at critical altitude, when the pressures are those selected for cruising. In the opinion of some engine builders, this may not be any practical disadvantage. However, there are other engine builders who demand that the regulator shall give wide open throttle at critical altitude, not only when the pressure selection is at high values specified for take-off and emergency, but also when the pressure selection is at lower values specified for cruising.

It is therefore an object of the present invention to provide a throttle valve controller so constructed and arranged as to provide a manual control of the throttle supplemented by an automatic control which is so constructed that the total amount of throttle movement effected manually and automatically brings the throttle to wide open position at critical altitude throughout a range of pressure selections extending from the high pressures specified for take-off and emergency to substantially lower pressures specified for cruising. At less than critical altitude the opening of the throttle will vary in accordance with the pressure selected.

In the disclosed embodiment of the present invention this object is accomplished by allowing the piston of the hydraulic servo motor to travel whatever distance is required to move the throttle valve to substantially wide open position at critical altitude, for a wide range of pressure selections extending from the pressure selection desirable for minimum cruising up to the maximum required for emergency operation. A variable stop adjusted by the main control lever determines the travel of the servo-piston with predetermined relation to the extent of opening of the throttle valve as effected manually by movement of the main control lever which also selects the pressure to be maintained in relation to altitude. For example, when the main control lever is moved to select a pressure for take-off or emergency, the corresponding throttle valve movement is relatively great; then the variable stop is so located as to permit the servo-piston to travel a relatively short distance. When the main control lever is moved to select pressures for cruising, the throttle valve is moved to a less wide open position while the variable stop is so located as to permit the servo-piston to travel the greater distance required in order that the throttle will be brought to substantially wide open position by the combined operation of the manual means and the automatic servo-motor. In other words, for take off or emergency the manual movement of the throttle is great and the automatic movement small, whereas for cruising the manual movement of the throttle is smaller and the automatic movement greater.

Further objects and advantages of the present invention will be apparent from the following description, reference being had to the accompanying drawings wherein a preferred embodiment of the present invention is clearly shown.

In the drawings:

Fig. 5 is a side elevation taken in the direction of the arrow 5 of Fig. 2 and arrow 5 of Fig. 3.

Fig. 6 is a top view taken in the direction of the arrow 6 of Fig. 1.

Fig. 7 is a fragmentary sectional view on line 7—7 of Fig. 3.

Fig. 8 is a fragmentary sectional view on line 8—8 of Fig. 1.

Fig. 9 is a sectional view on line 9—9 of Fig. 7.

Figure 1:
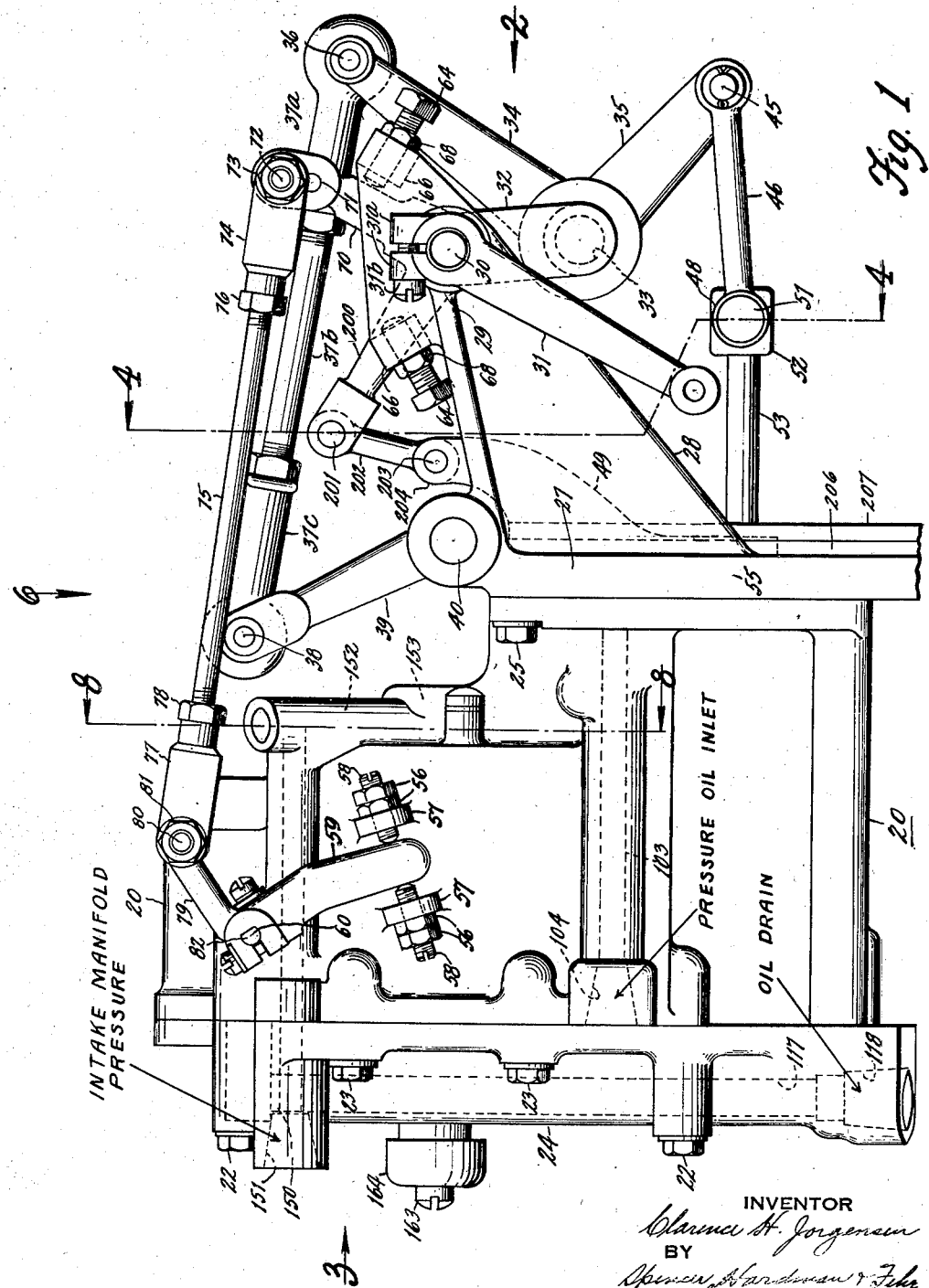
Fig. 1 is a side elevation of a fuel intake pressure controller embodying the present invention.
Figure 2:
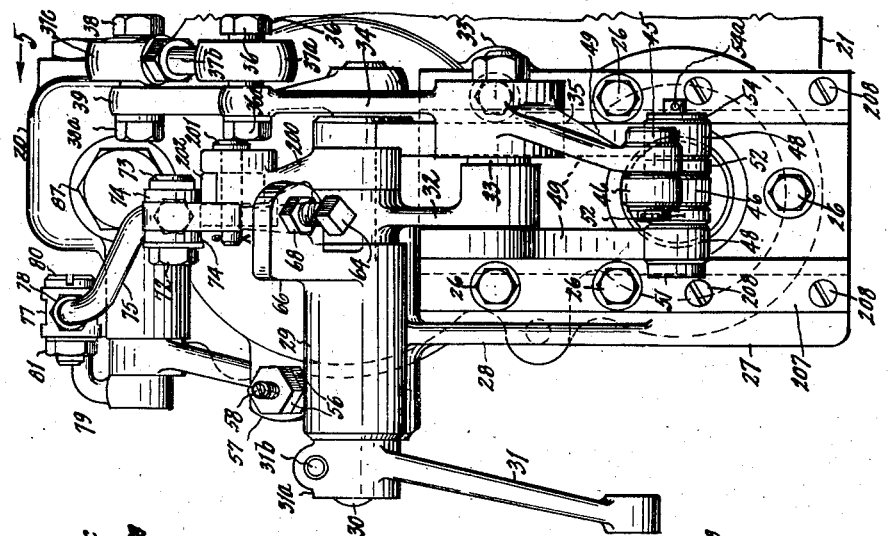
Fig. 2 is an end view taken in the direction of arrow 2 of Fig. 1.
Figure 10:
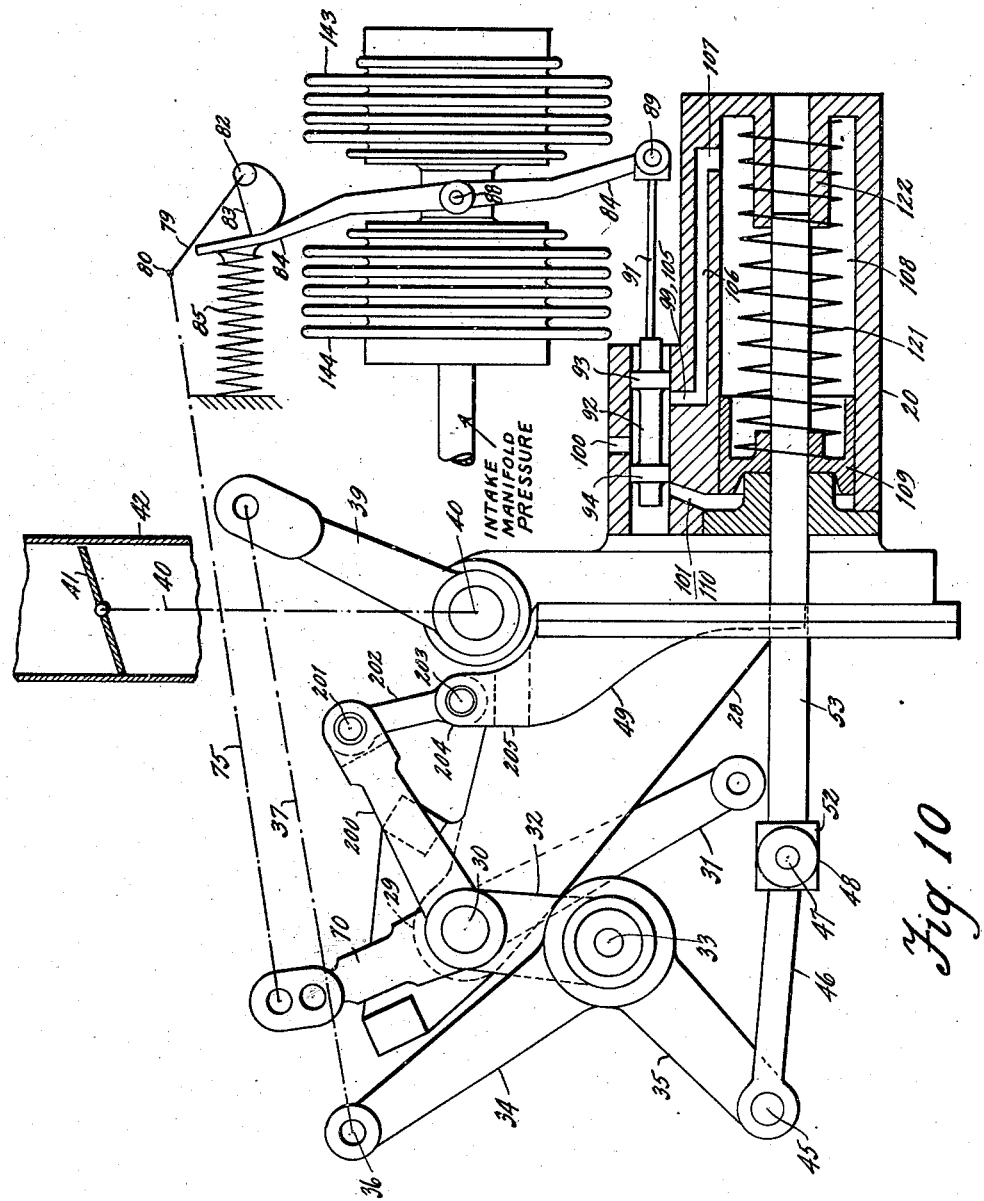
Fig. 10 is a diagrammatic side elevation viewed from the same side as Fig. 5 and showing the controller in condition for placing the throttle valve in idle position.

Referring to Fig. 1 the controller comprises a housing 20 having an integral bracket 21 (Figs. 5 and 6) by which the controller may be mounted on the frame of an internal combustion engine. Screws 22 and 23 secure to the housing 20 a plate 24. Screws 25 and 26 secure to the housing 20 a plate 27. Plate 27 provides a bracket 28 supporting a bearing 29 (Fig. 2). Bearing 29 supports a shaft 30 which is operated by a main control lever 31 connected by any suitable means (not shown) with the pilot's throttle control lever. When shaft 30 is turned by the arm 31 it moves an arm 32 secured to the shaft 30 and carrying at its free end a stud 33 which provides a movable fulcrum for a bell crank lever having arms 34 and 35. The free end of arm 34 is connected at 36 with a link comprising parts 37a, 37b and 37c which is connected at 38 with a lever 39 attached to a shaft 40 which, as shown diagrammatically in Fig. 10 is connected with the throttle valve 41 of an engine induction passage 42. Arm 35 is connected by a stud 45 with a link 46 connected with a pin 47 which carries rollers 48 for engaging variable stop bars 49. The pin 47 provides a pivotal connection with a block 52 threaded on the end of a piston rod 53 of a hydraulic servomotor to be described. Pin 47 is retained by an integral shoulder 51, a washer 54 and a cotter pin 54a.

The main control lever 31 is secured to the shaft 30 in various positions depending upon the manner of connecting the lever with the pilots' control lever. This is effected by providing the lever 31 with a clamping hub 31a cooperating with clamping screw 31b. The limits of movement of lever 31 are set by stop screws 64 threaded through lugs 66 respectively integral with bracket 28 and locked in adjusted position by nuts 68. The stop screws 64 engage a lever 70 integral with the lever 32 and provided with one or more holes 71 near its free end. One of the holes 71 may be selected for passing therethrough a screw 72 secured by nut 73 and providing a pivotal connection with a clevis 74, threadedly connected with a rod 75 and locked thereto in adjusted position by nut 76. Rod 75 is threadedly connected with the clevis 77 which is locked thereto in adjusted position by a nut 78. Clevis 77 is pivotally connected with an arm 79 by a screw pin 80 retained by nut 81. Arm 79 is connected with shaft 82 (Figs. 1 and 9) having a bearing in a tubular shaft 60 eccentric with respect to the axis of shaft 60.

Shaft 82 supports and drives a cam 83 (Figs. 7 and 9) for selecting pressure to be maintained in a predetermined relation to altitude in the fuel intake passage 42 (Fig. 10) of the engine. Cam 83 engages a lever 84 urged against the cam by a spring 85 located in a pocket 86 of housing 20 and retained by a plug 87. An adjustment of cam 83 relative to lever 84 can be effected by rotating the shaft 60 in its bearing in housing 20 by moving an arm 59 connected with shaft 60. The arm 59 is secured in adjusted position by locating screws 58 threaded through lugs 57 integral with housing 20 and secured by lock nuts 56 in position for preventing movement of arm 59 from the required position of adjustment. Intermediate its ends the lever 84 is pivotally supported by pin 88 and is attached at its lower end by pin 89 to a clevis 90 attached by rod 91 to a valve 92 having lands 93 and 94 and slidable within a valve sleeve 95 having annular grooves 96, 97 and 98 communicating respectively with the interior of said sleeve by ports 99, 100 and 101. There are four each of the ports 99, 100 and 101 as indicated in Fig. 8.

The ports 100 are the high pressure inlet ports and are connected by passage 102 with a passage 103 (Fig. 9) which, as shown in Fig. 1, communicates with an opening 104 for receiving a threaded pipe (not shown) by which a connection is made with the oil pressure system of the engine. As shown in Fig. 7 ports 99 are connected with ports 100; therefore pressure oil will flow from 103, 102, 97, 100, sleeve 95, ports 99 to groove 96. Groove 96 is connected by a cross-passage 105 (Fig. 8) with a longitudinal passage 106 having an outlet at 107 (Fig. 7) communicating with the left end of cylinder 108 provided by housing 20. The pressure fluid therefore urges a piston 109 connected with rod 53 toward the right. During movement of the piston 109 toward the right into the position shown in Fig. 7 any hydraulic fluid at the right end of the piston would be discharged through port 110, annular groove 98, ports 101, through the valve sleeve 95 and through the pocket 111 which is connected by passage 112 (Fig. 9) with the chamber 113 (Fig. 7), located in housing 20 and exterior to the cylinder 108.

Figure 3:
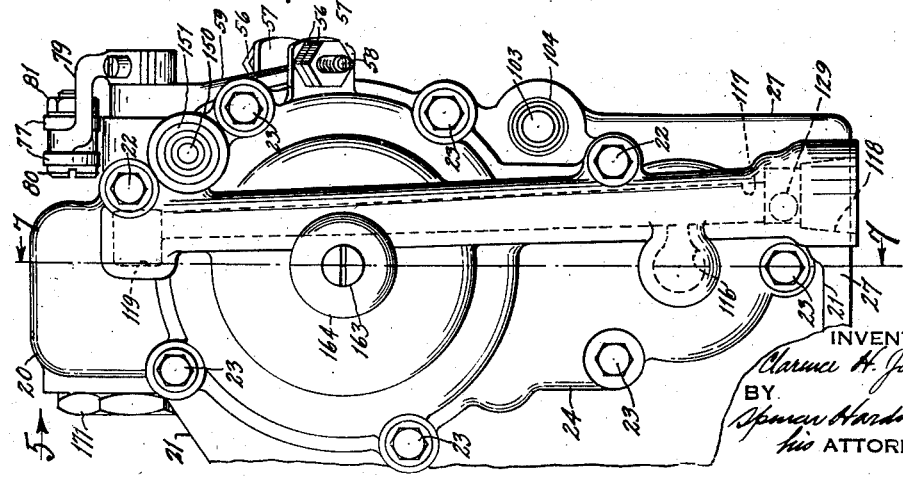
Fig. 3 is an end view taken in the direction of the arrow 3 of Fig. 1.

When valve 92 is moved into the position shown in Fig. 11 by means to be described later so as to connect ports 100 and 101, pressure fluid flows through port 110 into the right end (Fig. 7) of cylinder 108 and moves the piston 109 toward the left and the hydraulic fluid at the left of the piston 109 flows out of the cylinder 108 through passages 107, 106 and 105 and into annular groove 96 and through ports 99 and into the interior of sleeve 95 and out through the left end of sleeve 95 (Fig. 7) and into the chamber 113. The bottom of chamber 113 is drained through a restricted passage 115 (Fig. 7) leading into a pocket 116 which is connected as shown in Fig. 3 with a drain passage 117 provided at its lower end with screw threads 118 for connection with a drain pipe. The vertical passage 117 leads from a short horizontal passage 119 communicating with the upper portion of the chamber 113. During operation of the controller, while the engine is running, more oil is discharged into the chamber 113 than can be drained by the passage 115 alone, therefore this oil rises in the chamber 113 to the level of the lower wall of the passage 119 (Fig. 7), thereby substantially filling the chamber 113 with hydraulic fluid.

The left end of cylinder 108 is closed by plug 120 urged by a spring 121 against the plate 24 which provides the passages 115, 116, 117, 118 and 119. The spring 121 serves to move the piston 109 into the position shown in case of failure of oil pressure. Plug 120 provides a tubular bearing 122 for supporting the piston rod 53 which when moved to the extreme left position is received by the pocket 116. Any leakage of pressure fluid through the part 122 of the plug 120 is drained through pocket 116 and into passage 117 (Fig. 3). To the right of piston 109 the rod 53 passes through a bushing 125 supported by a plug 126 extending into hole in the plate 27 and through an oil seal member 127 supported by the plug 126. Any hydraulic fluid that would leak past the bushing 125 is caught by the oil seal 127 and the excess is drained through a vertical drain passage 128 leading to a horizontal drain passage 129 (Fig. 9) connected at the drain passage 117 (Fig. 3).

A spring 130 is located in the pocket 111 (Fig. 7) for the purpose of urging the flanged head 131 of sleeve 95 against the shoulder 132 provided by housing 22.

The fulcrum pin 88 of lever 84 is supported by bridge members 140 (Fig. 7) integral with plates 141 and 142 connected respectively with flexible metal bellows 143 and 144 which are connected respectively at their outer ends with plates 145 and 146. The space bounded by plates 141 and 145 and the bellows 143 is hermetically sealed and is evacuated so that these members provide an aneroid which compensates for any effect on bellows 144 due to change in atmospheric pressure. Since the bellows 144 is to be responsive to engine fuel intake pressure, the controller provides passages leading into the interior of the bellows 144. These passages include the horizontal passage 150 having a threaded end 151 (Fig. 3) for connection with a pipe (not shown) which is connected with the engine intake. Horizontal passage 150 is connected by vertically inclined passage 152 (Fig. 8) with a pocket 153 in housing 20. Pocket 153 opens into the space within the plate 146 and communicates with the interior of bellows 144 through a hole in a plate 154 serving as a retainer for a spring 156 bearing also against the plate 142. Screws 157 secure plate 146 and a gasket 155 to the housing 20. Springs 158 and 159 are located within the bellows 143 and are confined between the plates 141 and 145. The springs 156, 158 and 159 are so interrelated and calibrated that the movements of pivot pin 88 bear a substantially linear relation to the changes in fuel intake pressure. An adjustment can be made by changing the position of the plate 145 relative to the fixed plate 146. Fig. 7 shows that the plate 145 is located against a tubular plug 160 threaded into the tubular boss 161 of plate 24. Plug 160 is retained in position by a lock nut 162. Screw 163 which retains a lock nut cover 164 passes through a plain hole in plug 160 and is screw threadedly received by the plate 145. To change the position of plate 145 relative to plate 146, screw 163 is removed and the cover 164 is removed to provide access to the nut 162 which is loosened so as to permit turning of the plug 160 by the screw driver slots 166 therein. The plug 160 is turned in or out according to the adjustment to be made; and the lock nut 162 is tightened to secure the plug 160 in the desired position. The screw 163 and lock nut cover 164 are replaced and the screw 163 is tightened so as to urge the plate 145 against the inner end of the plug 160.

Access to the upper portion of chamber 113 in housing 20 is provided through an opening 170 (Fig. 9) closed by plug 171.

The operation of the controller is as follows: normally the parts of the controller occupy the position shown in Fig. 10; and the throttle valve 41 is in idle position shown at approximately 18 degrees from horizontal. The main control lever 31 is moved from the position in Fig. 10 to that shown in Fig. 11, thereby causing arm 32 to move clockwise to the position in Fig. 11 and likewise the pivot 33 of the floating bell crank lever whose arm 34 is caused to move counterclockwise around pivot 33, while the arm 35 is pivoted around the stud 45 which moves upwardly. Through link 37, diagrammatically illustrated in Figs. 10 and 11, this counterclockwise movement of lever arm 34 causes throttle operating lever 39 to move counterclockwise from the position shown in Fig. 10 to that shown in Fig. 11, thereby causing a counterclockwise rotation of shaft 40 and 56° movement of throttle valve 41 from the idle position shown in Fig. 10. In the illustrated embodiment of the invention, the main control lever 31 has been rotated manually its maximum distance. Therefore the movement of valve 41 between the position shown in Figs. 10 and 11 is the maximum movement of the valve which can be effected by manual operation. If main control lever is moved a lesser amount, the valve 41 will be moved manually a lesser amount.

Figure 11:
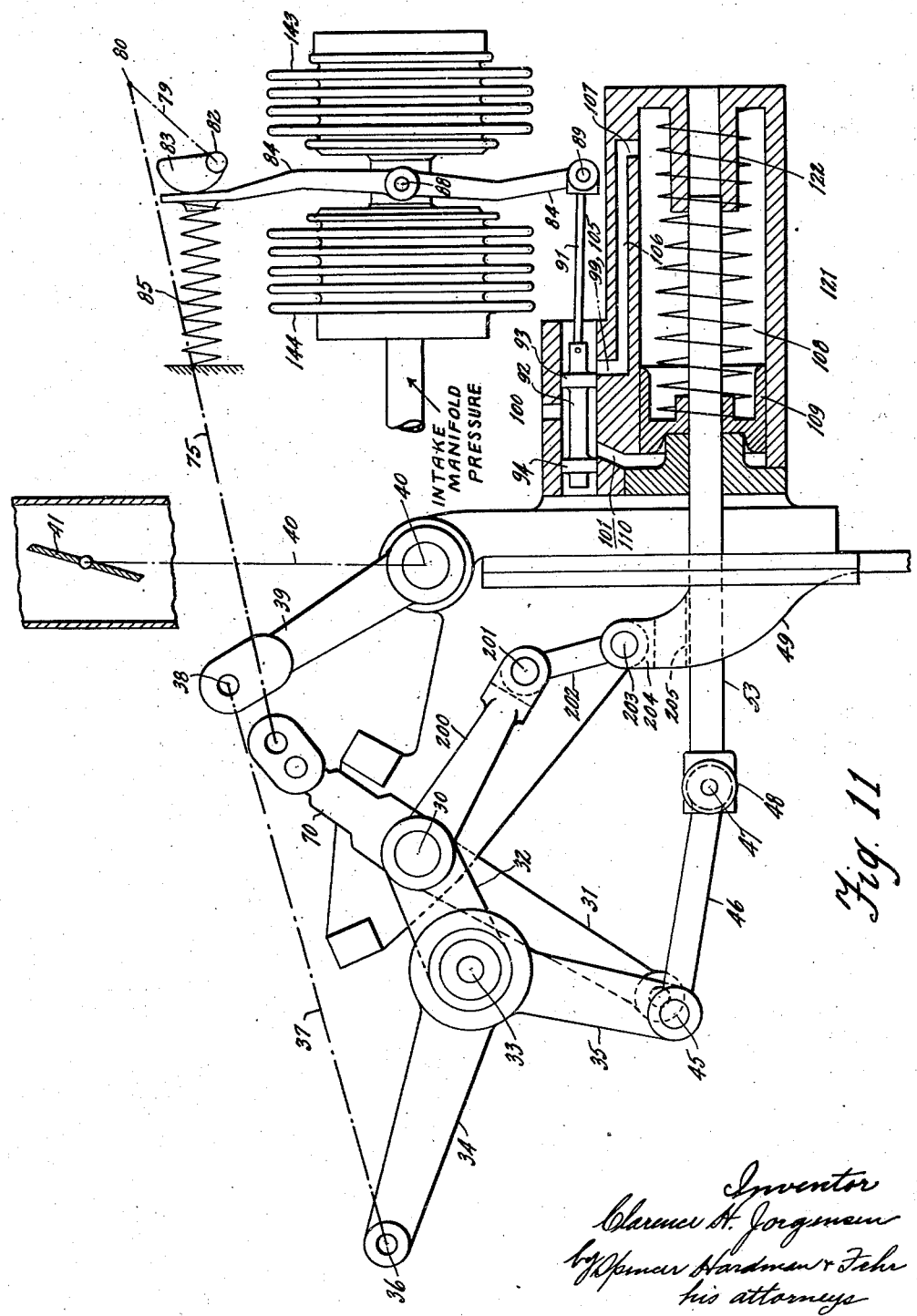
Fig. 11 is a view similar to Fig. 10 showing the condition of the controller after the throttle valve has been opened manually to a certain extent.
Figure 12:
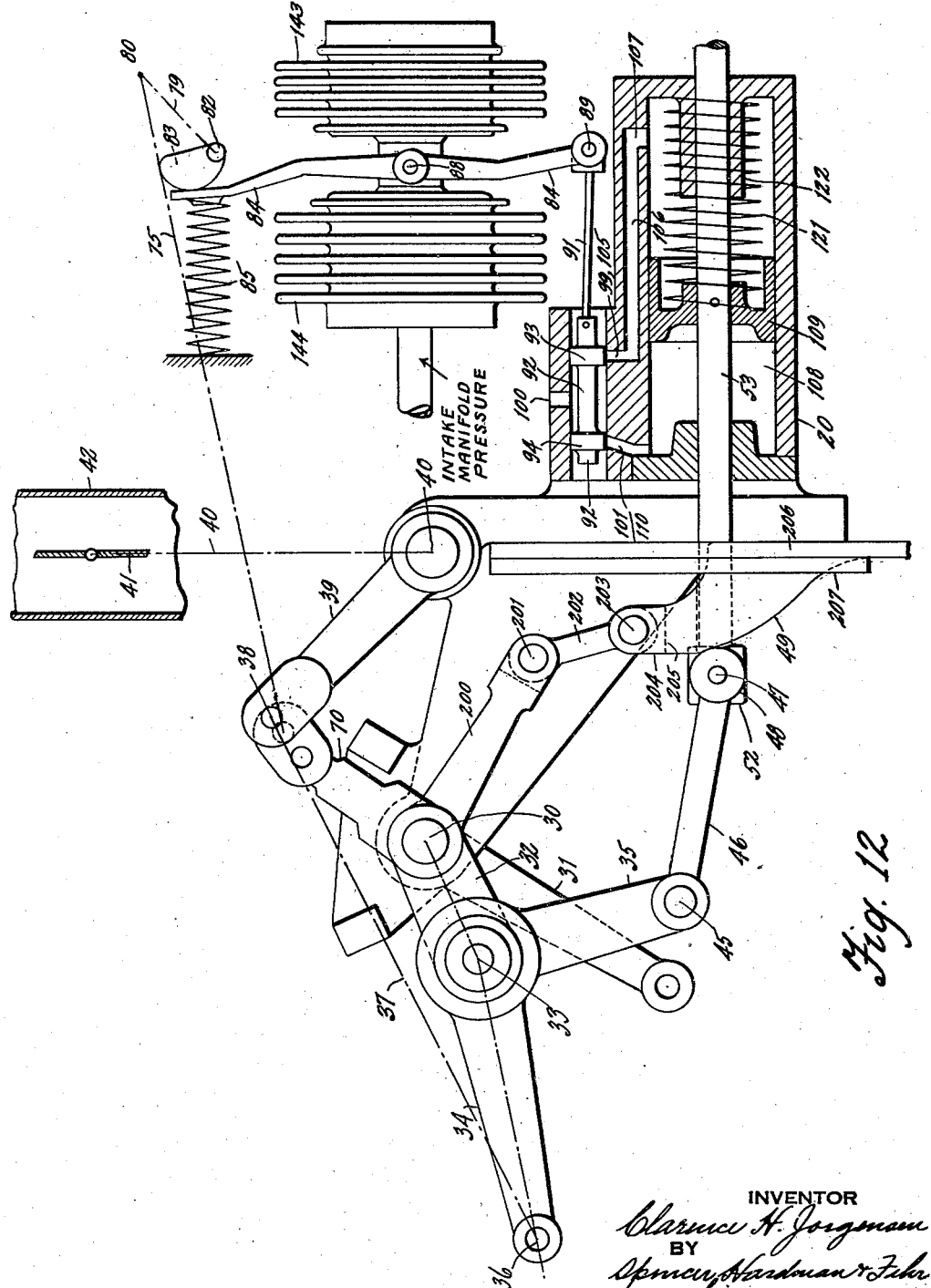
Fig. 12 is a view similar to Fig. 11 showing the condition of the controller after moving the throttle automatically to substantially full open position from the position from which the throttle was manually operated.

Movement of the main control lever 31 into the position shown in Fig. 11 causes a movement of lever arm 70 from the position shown in Fig. 10 to that shown in Fig. 11, thereby causes through the intermediate link 75, lever arm 79 and cam shaft 82, a movement of the pressure selector cam 83 from the position shown in Fig. 10 to that shown in Fig. 11, thereby permitting the spring 85 to move the lever 84 clockwise from the position shown in Fig. 10 to that shown in Fig. 11, thereby causing valve 92 to move left from the position shown in Fig. 10 to that shown in Fig. 11, thereby placing port 100 in communication with port 101, thereby causing pressure fluid to flow into the left end of the cylinder 108 as shown in Fig. 11 or at the right end of the cylinder as shown in Fig. 7. This causes the piston 109 and the piston rod 53 and the rollers 48 and the link 46 to move toward the right. As the link 46 moves right, floating bell-crank lever arms 34, 35 move counterclockwise about pivot 33 which remains fixed because lever 31 is held in fixed position by virtue of its connection with the pilot's control lever which is retained in fixed position by frictional or other connection with a stationary sector. As the bell-crank moves counterclockwise, link 37 and lever 39 move toward the left to cause whatever further opening movement of valve 41 is required, in order to produce, at sea level or for any particular altitude of the aircraft at the time the lever 31 is operated to select a pressure, the engine intake pressure which was so selected by movement of said lever 31. When that pressure is obtained, bellows 144 will expand to cause the valve 92 to close ports 101 and 99 and piston 109 will cease moving. To maintain the pressure selected, as the altitude increases, the throttle valve 41 must be opened wider and at critical altitude the throttle valve 41 will be wide open or 90° to horizontal, as shown in Fig. 12. Since the valve 41 is located in idle position at an angle of 72° to the axis of pipe 42, a 72° movement of the valve 41 is required to locate it in wide open position. The maximum movement of the main control lever 31 required to give the highest pressure selection caused the valve 41 to move 56° from its idle position. To complete the 72° movement, the piston 109 is required to move just far enough to cause valve 41 to move an additional 16°. Above the critical altitude, the bellows 144 contracts and "calls" for more throttle opening by moving servo control valve 92 toward the left in Fig. 12, thereby placing pressure fluid at the left of piston 109. It would, however, be undesirable to permit the piston 109 to move further to the right because the throttle valve is already standing in its full open position and if no stop member for the throttle is provided which would prevent a movement beyond the full open position, such further movement of the piston 109 would actually move the throttle valve toward closed position. Such a movement of the throttle would be detrimental and, therefore, the further movement of piston 109 to the right is positively blocked. If it be desired to obtain a higher critical altitude, means can be provided which are effective to increase the relative speed of the supercharger, such a means being disclosed in the application of C. H. Jorgensen and W. H. Taylor, Serial No. 480,034, filed March 22, 1943.

Figure 4:
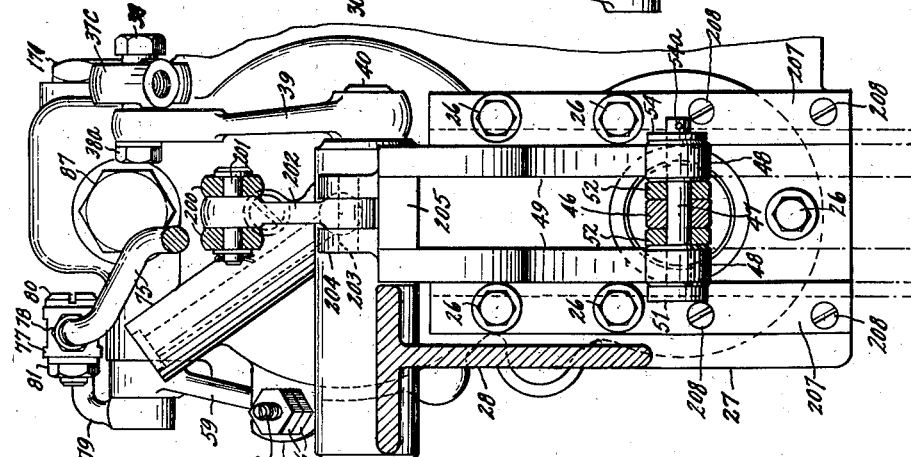
Fig. 4 is a sectional view on line 4—4 of Fig. 1.

The blocking of any further movement of piston 109 to the right is effected by the engagement of the rollers 48 with the stop plates 49 which are moved from the position shown in Fig. 10 to that shown in Fig. 11, when lever 31 is moved to select the maximum pressure. For this purpose shaft 30, operated by lever 31, drives an arm 200, connected by a pin 201 with a link 202 connected by a pin 203 with ears 204 integral with a bar 205 integral with the stop plates 49. Plates 49 (Fig. 4) are guided by way-bosses 206 integral with plate 27 and by way-boss cover-plates 207 secured by screws 208 and also by screws 26.

It will be understood that the plates 49 are so shaped that they permit the piston 109 to move to the right the necessary distance to bring the throttle valve to wide open position at critical altitude for any particular pressure which can be selected by operation of the main control lever. In Fig. 12, the main control lever has been moved to a position to select the maximum pressure obtainable and the plates 49 have been moved to a position where the rollers 48 can move only a relatively short distance before engaging the plates. This will permit a relatively small movement of piston 109 which is all that is necessary for effecting full opening of the throttle at critical altitude for that particular pressure selection. If the control lever is moved to select a lower pressure the plates are positioned so that a greater movement of the piston 109 is permitted, this being necessary to bring the throttle to wide open position at critical altitude when the lower pressure is selected. In this way greater movements of the piston are permitted when the selected pressures are low than when the selected pressures are high, as has been previously indicated.

Figure 13:
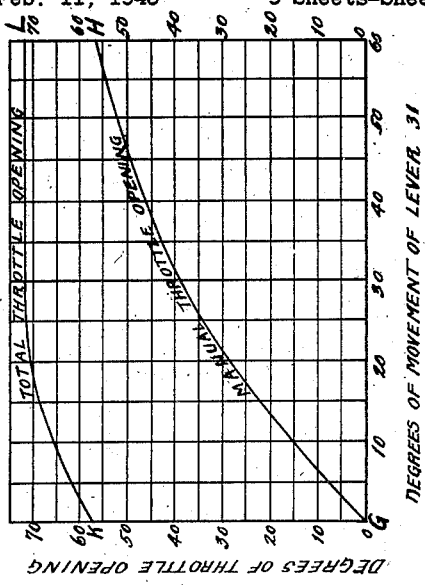
Fig. 13 is a chart showing the relation of throttle opening to movement of the control lever of the regulator.

Fig. 13 shows the relation of throttle opening to movement of lever 31. When lever is moved 60°, the distance required to select the maximum pressure to be maintained, the manually effected throttle movement is H or 56°, and the automatic movement obtained at critical altitude by the hydraulic servo is L–H or 16°, L or 72° being the maximum throttle opening movement. Curve GH shows manually effected throttle opening movement from idle for various positions of lever 31 from the 0° to the 60° position. Curve KL shows the maximum possible opening movement of the throttle. The distances vertically between curves KL and GH show the amounts of automatic movement of the throttle effected by the servo. The automatic movement is minimum when lever 31 is at 60° position and is maximum when the lever 31 is at 0° position. The object is to obtain such a relation between the manual movements and the automatic movements of the throttle valve that maximum throttle opening can be obtained at critical altitude for a wide range of pressure selections. This condition is represented by curve KL which rises to maximum (72°) at the 25° position of lever 31 which is about the position for the selection of pressure required for minimum cruising. To give this result, stop plates 49 are shaped to allow the piston 109 to move greater distances when the pressure selections and manually effected throttle movements are less than the maximum.

Figure 14:
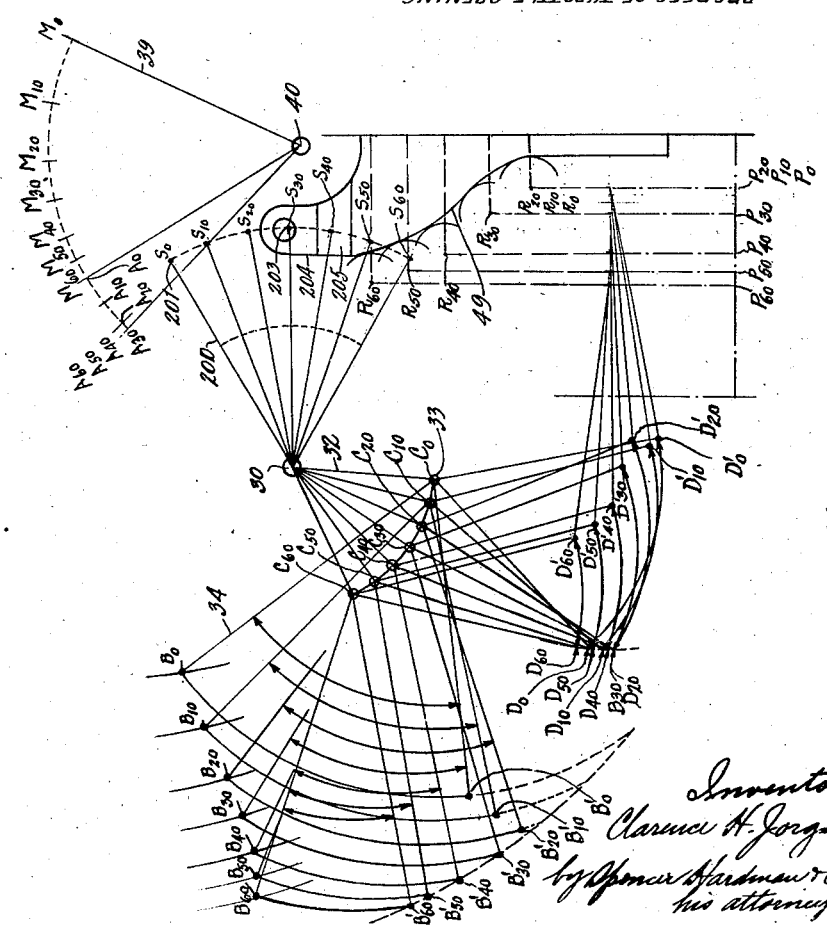
Fig. 14 is a diagram of movements of the regulator.

Fig. 14 shows how the contour of plates 49 was obtained to give the results shown in Fig. 13. The lever 31 is moved in 6 equal increments of 10° to complete the total of 60°. The first position of pivot 33 is $C_0$ and the succeeding position at $C_{10}$ to $C_{60}$. The corresponding manually effected positions of pivot 36 at the end of lever arm 34 are $B_0$, $B_{10}$ to $B_{60}$. The corresponding manually effected positions of pivot 45 at the end of lever arm 35 are $D_0$, $D_{10}$ to $D_{60}$. The corresponding manually effected movements of throttle lever 39 are $M_0$, $M_{10}$ to $M_{60}$. $M_{60}$ gives the 56° position of throttle 41. At the end of the automatically effected movements thereof, pivot 37 takes the positions $B'_0$, $B'_{10}$ to $B'_{60}$, and pivot 45 takes the positions $D'_0$, $D'_{10}$ to $D'_{60}$. Therefore plates 49 are shaped so that the rollers 48 are stopped when their axes are in the positions $P_0$, $P_{10}$ to $P_{60}$. It will be noted that positions $P_0$, $P_{10}$ and $P_{20}$ are all the same. This accounts for the droop in curve KL to the left of the 25° position of lever 31. This is permissible since the engine does not operate at a pressure less than that required for minimum cruising; and there is no object in trying to maintain maximum throttle opening. Points $P_0$, $P_{10}$ to $P_{60}$ are projected upwardly to points $R_0$, $R_{10}$ to $R_{60}$ to show the relation of the axes of rollers 48 to the plate 49 for various locations thereof as determined by the location of pivot 33, lever 200 and the pin 201 (on the end of lever 200) whose center is shown variously at $S_0$, $S_{10}$ to $S_{60}$. Points $A_0$, $A_{10}$ to $A_{60}$ show the total throttle opening as effected automatically in addition to the manually effected throttle opening. When lever 31 is at 0°, the automatically effected throttle opening is $A_0-M_0$ or 56°; and when lever 31 is at 60°, the automatically effected throttle opening is $A_{60}-M_{60}$ or 16°. Therefore the stop plates 48 cause the automatically effected throttle opening to vary from K or 56° to L–H or 16°. This causes the horizontal portion of curve KL to remain at maximum for pressure selections corresponding to position of lever 31 from 25° for cruising to 60° for emergency. The pressure selection for minimum cruise could be that corresponding to the 18° position of lever 31 with a throttle opening of only 2° under the maximum.

As altitude increases the engine exhaust back pressure decreases. Commensurate with the decrease in power required to exhaust the engine, there is a gradual decrease in the selected pressure as altitude increases. At critical altitude, the decrease amounts to a few percent of the pressure obtained at ground level by the setting of the main control lever 31. The gradual decrease or drop in the selected pressure is obtained by providing the bellows 144 with a surface exposed to atmospheric pressure greater in area than the exposed surface of bellows 143. Therefore, there is a pressure differential between the effects of atmospheric pressure on the bellows 143 and 144. As altitude increases, this pressure differential decreases. At zero atmospheric pressure this differential would be zero. Consequently, there is a relative movement of pivot 88 toward the right in Fig. 12 as altitude increases; and equilibrium is established as shown in Fig. 12 at a lower engine fuel intake pressure than would otherwise obtain if the external area of the bellows 143 and 144 were equal.

The disclosed embodiment of the present invention is one of many combinations of manually effected and automatically effected throttle movements which are possible by varying the geometry of the moving parts and the contour of the stop plates 49.

While the embodiment of the present invention as herein disclosed, constitutes a preferred form, it is to be understood that other forms might be adopted, all coming within the scope of the claims which follow.

What is claimed is as follows:

1. A throttle valve controller for supercharged internal combustion engines comprising a throttle valve operating element, manually operated means for moving the element to open the throttle valve, a servo-motor operating in response to engine intake pressure for moving the element to effect such additional opening movements of the throttle valve as are necessary to maintain a required intake pressure, means operated by the manual means for selecting the pressure to be maintained by operation of the servo-motor, and an adjustable stop operated by the manual means for variably limiting the servo-motor-effected movement of the throttle valve operating element to that required for moving the throttle valve to a predetermined open position when critical altitude is reached throughout a range of pressure selections required for cruising, take-off and emergency.

2. A throttle valve controller for supercharged internal combustion engines comprising a manually operated control member, a servo-motor having a force applying member, a throttle valve operating element, means for mechanically connecting the members with the element and providing for independent movement of the element by either member, means responsive to engine intake pressure for controlling the movement of the servo-motor member in order that the throttle valve will be opened to the extent necessary to maintain a required pressure, means operated by the control member for selecting a pressure to be maintained by operation of the servo-motor, and an adjustable stop moved by the control member for variably limiting the movement of the servo-motor member to that required for moving the throttle valve to a predetermined position when critical altitude is reached throughout a range of pressure selections required for cruising, take-off and emergency.

3. A throttle valve controller for supercharged internal combustion engines comprising a manually operated control member, a fluid pressure operated servo-motor having a cylinder and a piston member, a throttle valve operating element, a differential mechanical connection between the members and the element and providing for independent movement of the element by either member, means for controlling the movement of the piston to effect the additional opening movement of the throttle valve necessary to maintain a required engine intake pressure, said means comprising a valve for controlling the admission of pressure fluid to the cylinder, means operated by the control member for positioning the valve in order to select a pressure to be maintained and intake pressure responsive means for positioning the servo-valve in order to determine the movement of the piston required for the opening of the throttle valve to maintain a selected pressure; and an adjustable stop moved by the control member for variably limiting the movement of the piston to that required for moving the throttle valve to a predetermined open position when critical altitude is reached throughout a range of pressure selections required for cruising, take-off and emergency.

4. A throttle valve controller for supercharged internal combustion engines comprising a bell crank lever having a movable fulcrum; a fluid pressure operated servo-motor having a cylinder and piston; means for connecting the piston with an arm of the lever; means for connecting the other arm of the lever with the engine throttle valve; a manually operated control member for moving the fulcrum of the lever to effect opening movement of the throttle valve independently of the piston; means for controlling the movement of the piston to effect the additional opening movement of the throttle valve necessary to maintain a required engine intake pressure, said means comprising a valve for controlling the admission of pressure fluid to the cylinder, means operated by the control member for positioning the valve in order to select a pressure to be maintained and intake pressure responsive means for positioning the servo-valve in order to determine the movement of the piston required for the opening of the throttle valve to maintain a selected pressure; and an adjustable stop moved by the control member for variably limiting the movement of the piston to that required for moving the throttle valve to a predetermined open position when critical altitude is reached throughout a range of pressure selections required for cruising, take-off and emergency.

CLARENCE H. JORGENSEN.